United States Patent
Laugesen et al.

(10) Patent No.: US 12,490,918 B2
(45) Date of Patent: Dec. 9, 2025

(54) SPECTRO-TEMPORAL MODULATION TEST UNIT

(71) Applicant: Interacoustics A/S, Middelfart (DK)

(72) Inventors: Søren Laugesen, Middelfart (DK); Bue Bjerge Kristensen, Middelfart (DK); Thomas Behrens, Smørum (DK); Raul Sanchez-Lopez, Middelfart (DK); Johannes Zaar, Smørum (DK); Nicholas Crowe, Smørum (DK); James Michael Harte, Smørum (DK); Lisbeth Birkelund Simonsen, Middelfart (DK)

(73) Assignee: Interacoustics A/S, Middelfart (DK)

( * ) Notice: Subject to any disclaimer, the term of this patent is extended or adjusted under 35 U.S.C. 154(b) by 1034 days.

(21) Appl. No.: 17/536,763

(22) Filed: Nov. 29, 2021

(65) Prior Publication Data
US 2022/0167882 A1 Jun. 2, 2022

(30) Foreign Application Priority Data
Nov. 30, 2020 (EP) .................................... 20210602

(51) Int. Cl.
*A61B 5/12* (2006.01)
*A61B 5/279* (2021.01)
*A61B 5/38* (2021.01)

(52) U.S. Cl.
CPC .............. *A61B 5/125* (2013.01); *A61B 5/279* (2021.01); *A61B 5/38* (2021.01)

(58) Field of Classification Search
CPC ........... A61B 5/125; A61B 5/279; A61B 5/38; A61B 5/6817; H04R 2460/13; H04R 25/70
See application file for complete search history.

(56) References Cited

U.S. PATENT DOCUMENTS

| | | | | |
|---|---|---|---|---|
| 2001/0049480 A1* | 12/2001 | John | ......................... | A61B 5/38 600/559 |
| 2012/0238856 A1* | 9/2012 | Kidmose | .................. | A61B 5/38 600/379 |

(Continued)

OTHER PUBLICATIONS

Bernstein JG, Mehraei G, Shamma S, Gallun FJ, Theodoroff SM, Leek MR. Spectrotemporal modulation sensitivity as a predictor of speech intelligibility for hearing-impaired listeners. J Am Acad Audiol. Apr. 2013;24(4):293-306. (Year: 2013).*

(Continued)

*Primary Examiner* — Eric F Winakur
*Assistant Examiner* — Hy Khanh Doan
(74) *Attorney, Agent, or Firm* — Birch, Stewart, Kolasch & Birch, LLP (57) ABSTRACT

The present application relates to an electrophysiologically based Spectro-Temporal Modulation (STM) test unit. The STM test unit comprises an STM stimulus generating unit, an output unit, wherein the STM stimulus generating unit is configured to provide STM test stimuli comprising at least one STM probe stimulus to a user via the output unit according to a predetermined STM test protocol. The STM test unit further comprises one or more electrodes for measuring electrophysiological responses of the user, and an analysis unit configured to analyse the recorded electrophysiological responses of the user measured in response to the provided stimuli. The present application further relates to a method of electrophysiologically based STM testing of a user.

16 Claims, 3 Drawing Sheets

(56) References Cited

U.S. PATENT DOCUMENTS

2014/0334642 A1* 11/2014 Kwak ................ H03G 3/20
                                                    381/102
2015/0350794 A1    12/2015 Pontoppidan

OTHER PUBLICATIONS

Mehraei, "Spectrotemporal modulation sensitivity for hearing impaired listeners: Dependence on carrier center frequency and the relationship to speech intelligibility," The Journal of the Acoustical Society of America, vol. 136, No. 1, 2014, pp. 301-316, 16 pages total.
Mohan, "Neural Correlates of Spectral, Temporal and Spectro-temporal Modulation," Graduate Theses and Dissertations, 2014, 113 pages total.
Sanchez Lopez et al., "Spectro-temporal modulation sensitivity and discrimination in normal hearing and hearing-impaired listeners," DTU Library, 2016, 2 pages total.
Zaar et al., "Investigating the relationship between spectro-temporal modulation detection, aided speech perception, and directional noise reduction preference in hearing-impaired listeners," Proceedings of the International Symposium on Auditory and Audiological Research, vol. 7, 2019, pp. 181-188, 8 pages total.
Zheng et al., "Spectro-temporal cues enhance modulation sensitivity in cochlear implant users," Hearing Research, vol. 351, 2017, pp. 45-54, 10 pages total.
Magits et al., "The effect of presentation level on spectrotemporal modulation detection", Hearing Research, vol. 371, 2019 (available online Nov. 2, 2018), pp. 11-18.
Otohub, "Pure Tone Test and Speech Test", Audiology lobile Audiometry, Mar. 6, 2019, pp. 1-8.

* cited by examiner

FIG. 3

SPECTRO-TEMPORAL MODULATION TEST UNIT

SUMMARY

The present application relates to an electrophysiologically based Spectro-Temporal Modulation (STM) test unit.

The present application further relates to a method of electrophysiologically based Spectro-Temporal Modulation testing of a user.

A Test Unit:

The STM test has received much interest lately as a simple, language-independent measure of supra-threshold hearing ability, and more specifically as a proxy for complicated aided speech-in-noise testing.

In the STM test, a spectro-temporally modulated probe sound (STM probe stimulus) is compared to an unmodulated reference sound (STM reference stimulus), with an otherwise similar spectrum. The reference sound, or the carrier, is typically a broad-band noise signal (while alternative carriers may be considered). By means of an adaptive rule, the degree of modulation in the probe sound is varied until the patient's threshold of modulation-detection is reached. The degree of modulation at threshold is the result of the test.

High correlations between STM detection thresholds and speech reception thresholds (SRT) have been observed in several studies, particularly for STM stimulus parameters that are similar to those observed for real speech.

The known STM test, however, relies on psychophysical test paradigms that are impossible to use with young children and other hard-to-test populations. Moreover, it is possible for malingerers to cheat the psychophysical test paradigms to produce artificially elevated thresholds.

Accordingly, there is a need for a new STM test unit and STM method that is able to provide an STM detection threshold of hard-to-test users and removes the possibility of cheating the test.

In an aspect of the present application, an electrophysiologically based STM test unit is provided.

The electrophysiologically based STM test unit may comprise an STM stimulus generating unit.

The electrophysiologically based STM test unit may comprise an output unit.

The output unit may be configured to provide a stimulus perceived by the user.

The output unit may be configured to provide a stimulus perceived by the user as an acoustic signal based on a processed electric signal.

For example, the output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). For example, the output unit may comprise a number of electrodes of a cochlear implant (for a CI type hearing aid) or a vibrator of a bone conducting hearing aid.

The STM stimulus generating unit may be configured to provide STM test stimuli to a user.

The STM test stimuli may comprise at least one STM probe stimulus.

Accordingly, the STM stimulus generating unit may be configured to provide at least one STM probe stimulus to a user.

The STM stimulus generating unit may be configured to provide STM test stimuli comprising at least one STM probe stimulus to a user via the output unit according to a predetermined STM test protocol.

In response to providing the required STM stimuli, the STM test unit may be configured to measure the corresponding electrophysiological responses of the user by one or more electrodes.

For example, the electrophysiological responses may be recorded through a standard clinical four-electrode montage or full-scalp montages with e.g. 64 or 128 channels.

In response to measuring the corresponding responses, the analysis unit of the STM test unit may be configured to analyse the recorded electrophysiological responses of the user.

The analysis may comprise providing an indication of whether an electrophysiological response is recorded.

The analysis may comprise providing an indication of whether an electrophysiological response is recorded depending on the degree of modulation of the at least one STM probe stimulus.

The analysis may comprise averaging the recorded electrophysiological responses for each of the respective modulation degrees used.

The analysis unit may be configured to provide a result of the recorded electrophysiological responses based on the analysis.

Testing, by the STM test unit, may in either case be done monaurally, one ear at a time, or binaurally.

The STM stimulus generating unit may be configured to shape the sound pressure level (SPL) of said STM probe stimulus.

The STM stimulus generating unit may be configured to shape the sound pressure level (SPL) of said STM probe stimulus as a function of frequency.

The SPL of said STM probe stimulus as a function of frequency may be based on the user's hearing threshold level (HTL).

For example, the predetermined HTL of the user may be determined at an earlier stage, e.g. by a hearing care professional (HCP) in terms of a standard audiogram in order to have an accurate measure of the predetermined HTL.

For example, an HTL may be determined for the user (e.g. a person). This predetermined HTL may be stored in a memory of the electrophysiologically based STM test unit. When carrying out an electrophysiologically based STM test on the user (by use of the electrophysiologically based STM test unit), the STM stimulus generating unit may be configured to obtain/retrieve the stored predetermined HTL from said memory.

The STM stimulus generating unit may be configured to shape the SPL of said STM probe stimulus as a function of frequency based on the predetermined HTL stored in the memory of said STM test unit.

The STM stimulus generating unit may be configured to shape the SPL of said STM probe stimulus as a function of frequency based on a first stored predetermined HTL until a second predetermined HTL (or further) of the user is stored in said memory. The second predetermined HTL may replace the first predetermined HTL in said memory (or alternatively, be stored together with said first predetermined HTL). Thereby, the first or second or additional predetermined HTL of a specific user may be obtained/retrieved by the STM stimulus generating unit one or more times from said memory prior to carrying out an electrophysiologically based STM test of that specific user.

A predetermined HTL of two or more users may be stored in said memory. Thereby, the STM stimulus generating unit may obtain/retrieve the stored predetermined HTL of the specific user, on which the electrophysiologically based STM test is to be carried out.

The electrophysiologically based STM test unit may comprise a timing unit.

The timing unit may be suitable for determining an initiation of the predetermined STM test protocol.

For example, the timing unit may be configured to determine a starting point of the initiation of the predetermined STM test protocol.

For example, the timing unit may be configured to time a time interval between starting points of the initiation of the predetermined STM test protocol.

For example, the timing unit may time a time interval of 3 months, 6 months, 9 months, 12 months between said starting points. For example, the STM test unit may e.g. be timed to initiate the predetermined STM test protocol every 6 months. Thereby, the hearing ability of e.g. a hearing aid user may be checked at regular intervals by the STM test unit so that an indication of a possible further degradation of hearing ability may be detected and further investigated at a qualified HCP.

The initiation of the predetermined STM test protocol may comprise the STM stimulus generating unit providing STM test stimuli comprising at least one STM probe stimulus to the user.

The initiation of the predetermined STM test protocol may comprise the one or more electrodes measuring the corresponding electrophysiological responses.

The initiation of the predetermined STM test protocol may comprise the analysis unit analyzing the recorded electrophysiological responses of the user.

For example, the STM test unit and/or the analysis unit may be configured to send an alert to an auxiliary device, e.g. a smartphone, a tablet, a computer, of the user. Thereby, the user may be advised to contact an HCP to have a new hearing test made.

For example, the STM test unit and/or the analysis unit may be configured to send an alert over the internet to an HCP, e.g. via an auxiliary device. Thereby, the user may automatically be contacted and asked to visit an HCP to have a new hearing test made.

The electrophysiologically based STM test unit may comprise a memory.

The memory may store the STM test stimuli.

The memory may store the predetermined STM test protocol.

The memory may store the predetermined HTL values of the user, as described above.

Thereby, the STM test unit may be configured to carry out an STM test according to a test protocol, and also carry out an analysis of the measured electrophysiological responses without having to communicate with an external device before being able to carry out the test and analysis.

The electrophysiologically based STM test unit may comprise at least one insert earphone.

The electrophysiologically based STM test unit may comprise at least one hearing aid.

For example, the at least one insert earphone or hearing aid may comprise the output unit of the STM test unit. Thereby, the STM stimuli may be provided by the output unit of the insert earphone or hearing aid to at least one ear of the user.

For example, the at least one insert earphone or hearing aid may comprise the one or more electrodes for measuring electrophysiological responses of the user. Thereby, STM stimuli may be provided to at least one of the ears of the user and the corresponding electrophysiological responses may be measured by the at least one insert earphone or hearing aid.

The electrophysiologically based STM test unit may comprise two insert earphones.

The electrophysiologically based STM test unit may comprise two hearing aids.

For example, the two insert earphones or hearing aids may each comprise an output unit of the STM test unit.

The electrophysiologically based STM test unit may be constituted by at least one insert earphone.

The electrophysiologically based STM test unit may be constituted by at least one hearing aid.

For example, the at least one insert earphone or hearing aid may comprise the STM stimulus generating unit, the output unit, the one or more electrodes, and the analysis unit. Thereby, the insert earphone or hearing aid may, while arranged in one of the ears of the user, provide the STM test stimuli to the ear of the user via the output unit according to the predetermined STM test protocol.

In case the STM test unit comprises or is constituted by at least one insert earphone or at least one hearing aid, said at least one insert earphone or at least one hearing aid may comprise the one or more electrodes.

For example, the one or more electrodes may be arranged on the insert earphone or hearing aid so that the electrodes contact the skin of the user when the insert earphone or hearing aid is arranged on the user.

For example, the one or more electrodes may be connected to the insert earphone or hearing aid, e.g. via a wire or wirelessly, so that the electrodes may be arranged at suitable sites on the scalp of the user.

For example, a behind-the-ear (BTE) part of the hearing aid may comprise the one or more electrodes.

An in-the-ear part of said at least one insert earphone or hearing aid may comprise said one or more electrodes.

The one or more electrodes may be embedded in the outer surface of the in-the-ear part.

The one or more electrodes may be arranged at the part of the outer surface of the in-the-ear part, which contacts the inner wall of the ear canal. Thereby, the one or more electrodes may be in contact with the skin of the user continuously while the user wears the at least one insert earphone or hearing aid.

For example, the in-the-ear part may e.g. be an ear mould or a dome of a hearing aid.

The electrophysiologically based STM test unit may comprise a loudspeaker.

For example, the loudspeaker may comprise the output unit of the STM test unit.

For example, the loudspeaker may be able to present the STM test stimuli as a sound field surrounding the user. For example, the loudspeaker may be able to present the STM test stimuli in the area surrounding the user. Thereby, the user may wear one or more hearing aids while the STM test is carried out by the STM test unit.

The STM test stimuli provided to the user may be compensated for any already existing hearing loss of said user.

The STM test stimuli provided to the user may be compensated for any already existing hearing loss of said user by adjusting the STM test stimuli according to the predetermined HTL (of the specific user) stored in the memory of the electrophysiologically based STM test unit. Thereby, a more accurate and potentially faster determination of STM detection threshold is achieved, as the initial settings of the STM test stimuli are optimal for the specific user.

The one or more electrodes may be electroencephalography (EEG) electrodes.

For example, the electrophysiological responses may be recorded through a standard clinical four-electrode EEG montage or full-scalp EEG montages with e.g. 64 or 128 channels.

For example, the one or more EEG-electrodes may be mounted on (or embedded in) the outer surface of the insert earphone or hearing aid so that the EEG-electrodes contact the skin of the user when the user wears the insert earphone or hearing aid.

The one or more electrodes may further comprise one or more of different types of physiological sensors measuring one or more physiological signals, such as electrocardiogram (ECG), photoplethysmogram (PPG), electrooculography (EOG), etc., of the user.

The provided stimuli may comprise temporal modulations from 0.25 Hz to 32 Hz.

For example, the temporal modulations may be 4 Hz.

The provided stimuli may comprise spectral modulations from 0.25 to 16 cycles/octave.

For example, the spectral modulations may be 2 cycles/octave.

Thereby, STM test stimuli may be provided to the user that have characteristics approximately similar to those observed for real speech.

The predetermined STM test protocol may comprise providing a continuous modulated STM probe stimulus of constant SPL.

The predetermined STM test protocol may comprise analysing the electrophysiological response to the modulated STM probe stimulus in a manner time-locked to the spectro-temporal modulations imposed on the STM probe stimulus The predetermined STM test protocol may comprise varying the degree of modulation of the modulated STM probe stimulus.

For example, the STM probe stimulus may be varied according to a tracking procedure to obtain a threshold.

Thus, for example, the predetermined STM test protocol may be based on an auditory steady-state response (ASSR) test paradigm.

The STM test stimuli provided by the STM stimulus generating unit may further comprise at least one STM reference stimulus.

The predetermined STM test protocol may comprise providing successive bursts of STM reference stimuli.

The predetermined STM test protocol may comprise providing modulated STM probe stimuli at random times.

The predetermined STM test protocol may comprise analysing the recorded electrophysiological responses to determine responses to the provided STM probe stimuli.

The predetermined STM test protocol may comprise varying the degree of modulation in each modulated STM probe stimulus.

The predetermined STM test protocol may comprise varying the degree of modulation of the STM probe stimuli according to a tracking procedure to obtain a threshold.

When a difference between the STM reference stimuli and the STM probe stimuli is perceived by the user, there is a recordable electrophysiological response (e.g. ERP).

The degree of modulation may be varied until a threshold of detection is reached.

Thus, for example, the predetermined STM test protocol may be based on a mis-match negativity (MMN) test paradigm.

The predetermined STM test protocol may comprise providing a continuous on-going stimulus that alternates between STM reference stimulus intervals and STM probe stimulus intervals.

The predetermined STM test protocol may comprise providing the alternations at predefined times, corresponding to STM reference stimulus intervals, e.g., of 2 sec and STM probe stimulus intervals of 2 sec. Alternatively, the alternation times may be jittered randomly by a certain percentage of the stimulus interval to create an overall less predictable stimulus.

The predetermined STM test protocol may comprise analysing the recorded electrophysiological responses to determine responses to the stimulus transitions (i.e. said alternations), by averaging in the time domain predefined sections of the recorded electrophysiological responses (e.g. EEG) time-locked to the stimulus transitions. These electrophysiological responses are expected to mainly stem from brain processes in the auditory cortex. Electrophysiological responses to the transitions from STM reference stimulus to STM probe stimulus may be collected and averaged separately from the electrophysiological responses to the transitions from STM probe stimulus to STM reference stimulus, or they may all be averaged together.

The predetermined STM test protocol may comprise varying the degree of modulation in each of the modulated STM probe stimulus intervals.

The predetermined STM test protocol may comprise varying the degree of modulation of the STM probe stimuli according to a tracking procedure to obtain a threshold.

The degree of modulation may be varied until a threshold of detection is reached.

Thus, for example, the predetermined STM test protocol may be based on an acoustic change complex (ACC) paradigm.

The predetermined STM test protocol may further comprise analysing the STM probe stimulus intervals for their auditory steady-state response (ASSR) at the same time as analysing the ACC responses.

The STM reference stimulus may be a broad-band noise signal.

For example, the broad-band noise signal may be band limited to 353-5656 Hz.

The STM probe stimuli may be based on a similar carrier signal (as the STM reference stimulus) onto which the predetermined spectro-temporal modulations are imposed.

The STM reference and probe stimuli may alternatively be based on a tone-complex carrier.

The degree of modulation of the STM probe stimulus may be varied based on an adaptive method until the user's threshold of modulation-detection is reached.

The STM stimulus generating unit may be configured to vary/change the STM probe stimulus based on the analyzed recorded electrophysiological responses of the user by an analysis unit.

The STM stimulus generating unit may be configured to vary/change the STM probe stimulus based on the previously analyzed recorded electrophysiological response of the user by an analysis unit.

For example, the adaptive method may be a simple staircase method starting at maximum possible modulation and then descending in for example 2 dB steps until there is no response detected.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The hearing aid may be configured to operate in different modes, e.g. a normal mode and one or more specific modes, e.g. selectable by a user, or automatically selectable. For example, the hearing aid may at intervals be configured to operate as an electrophysiologically based Spectro-Temporal Modulation (STM) test unit according to above. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid, or to measure an electrophysiological response of the user. Alternatively, or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The STM stimulus generating unit may be connected to the output unit.

The STM stimulus generating unit may be connected to the memory. The STM stimulus generating unit may be configured to obtain/receive/retrieve data from the memory. The data may comprise STM test stimuli and/or predetermined STM test protocol and/or one or more predetermined HTL of one or more users.

The analysis unit may be connected to the memory. The analysis unit may be configured to store one or more STM hearing thresholds (determined by said analysis unit of said STM test unit) on said memory. The analysis unit may be configured to obtain/receive/retrieve one or more STM hearing threshold from said memory. The analysis unit may be configured to compare one or more STM hearing thresholds stored on said memory with the most recently determined STM hearing threshold of a specific user. Thereby, a confidence score (i.e. the validity) of the most recently determined STM hearing threshold may be determined by comparing two or more consecutively determined STM hearing thresholds of a specific user. Further, a development (e.g. a degradation) in a specific user's STM hearing threshold may be monitored.

The analysis unit may be connected to the one or more electrodes. The analysis unit may be configured to receive electrophysiological responses of a user from said one or more electrodes.

The STM stimulus generating unit may be connected to the analysis unit. The STM stimulus generating unit may be configured to carry out one of a plurality of predetermined STM test protocols based on a signal from the analysis unit. For example, when the analysis unit has successfully determined an STM hearing threshold based on a first predetermined STM test protocol, the analysis unit may transmit a signal to the STM stimulus generating unit. In response to receiving said signal, the STM stimulus generating unit may carry out a second predetermined STM test protocol, if required. Alternatively, or additionally, in response to receiving said signal, the STM stimulus generating unit may carry out said first predetermined STM test protocol again, if required (e.g. if the first run was not successful (e.g. not valid)).

Use:

In an aspect, use of an electrophysiologically based STM test unit as described above, in the 'detailed description of embodiments' and in the claims, is moreover provided. Use may be provided in a system comprising one or more insert earphones, hearing aids (e.g. hearing instruments), headsets, earphones, active ear protection systems, loudspeakers, etc.

A Method:

In an aspect, a method of electrophysiologically based Spectro-Temporal Modulation (STM) testing of a user is furthermore provided by the present application.

The method may comprise the step of providing STM test stimuli comprising at least one STM probe stimulus to at least one of the ears of the user by an STM stimulus generating unit, via an output unit.

The STM test stimuli may be provided according to a predetermined STM test protocol.

The method may comprise the step of providing one or more electrodes at the user.

For example, the one or more electrodes may be arranged at the ear, such as behind or in the ear, and/or at the scalp of the user.

The method may comprise the step of measuring electrophysiological responses of the user in response to a provided STM test stimulus.

The method may comprise the step of analyzing the measured electrophysiological responses of the user by an analysis unit.

The STM test stimuli may further comprise at least one STM reference stimulus.

The step of providing STM test stimuli may comprise providing at least one STM probe stimulus and at least one STM reference stimulus.

The method may further comprise shaping the sound pressure level (SPL) of said STM probe stimulus as a function of frequency based on a predetermined hearing threshold level (HTL) of the user.

The method may further comprise timing when the STM test protocol is to be initiated.

The initiation may comprise providing STM test stimuli comprising at least one STM probe stimulus to the user by the STM stimulus generating unit.

The initiation may comprise measuring the corresponding electrophysiological responses by the one or more electrodes.

The initiation may comprise analysing recorded electrophysiological responses of the user by the analysis unit.

It is intended that some or all of the structural features of the electrophysiologically based STM test unit described above, in the 'detailed description of embodiments' or in the claims can be combined with embodiments of the method, when appropriately substituted by a corresponding process and vice versa. Embodiments of the method have the same advantages as the corresponding devices.

Speech Audiogram

For hearing-diagnostic purposes and to assist hearing-aid fitting, measurement of Performance Intensity, Phonetically Balanced (PI-PB) roll-over is sometimes conducted. This involves measuring speech recognition in a quiet environment with single-word lists, at a number of different presentation levels.

The result is sometimes referred to as the Speech Audiogram. In normally hearing people and for patients with hearing loss of conductive or cochlear origin, the typical pattern of results will be a monotonous increase in performance (correct word score percentage) with increasing level that flattens out at a certain level.

However, in some patients a roll-over effect may be observed, where performance increases, peaks, and then reduces again as level increases (i.e. as the amplification in dB increases). Such a roll-over is typically interpreted as an indication of hearing loss of retro-cochlear origin. In addition, differences in performance at the ceiling (at the maximum of the score percentage) may be used to distinguish conductive from cochlear hearing loss. Diagnosing conductive hearing loss usually requires measurement of bone-conduction hearing thresholds, which are difficult to measure—particularly in remote-care scenarios.

Testing of PI-PB roll-over (or the Speech Audiogram) is relatively time consuming and requires the availability of adequate speech material with many word lists, as re-using word lists has the potential to confound the results of the test.

In addition, meaningful speech audiometry requires that the patient is familiar with the language in which the clinic's speech material is created. This cannot be taken for granted with non-native patients.

As also indicated in the introduction, in the STM test, at least one STM probe stimulus may be compared to at least one unmodulated STM reference stimulus, with an otherwise similar spectrum. The STM reference stimulus, or the carrier, is typically a broad-band noise signal. By means of an adaptive rule, the degree of modulation in the STM probe stimulus may be varied until the patient's threshold of modulation-detection is reached. This threshold may be the result of the test.

The STM test results may show similar effects as seen in word recognition when the level of the STM probe stimulus is varied. There is, however, already some evidence from normal-hearing listeners that STM results depend on presentation level in the hypothesised manner [1].

Replacing the PI-PB roll-over test (or Speech Audiogram) with STM testing at a range of levels would solve all the problems described above. An STM-based test may be faster, there is no issue with the number of available word lists, and familiarity of language will not be an issue either. In addition, an STM-based test for PI-PB roll-over may readily be implemented in a fully user-operated automatic fashion, even in a remote-case scenario.

The STM-based 'Speech Audiogram' may be useful both to assess PI-PB roll-over as well as to distinguish conductive from cochlear hearing loss.

Accordingly, a psychophysically based STM test unit may be provided for carrying out the PI-PB roll-over test.

Alternatively, an electrophysiologically based STM test unit may be provided for carrying out the PI-PB roll-over test.

The psychophysically and/or electrophysiologically based STM test unit may comprise:
an STM stimulus generating unit,
an output unit,
wherein the STM stimulus generating unit may be configured to provide STM test stimuli comprising at least one STM probe stimulus to a user via the output unit according to a predetermined STM test protocol.

The STM test stimuli may further comprise at least one STM reference stimulus.

The psychophysically based STM test unit may further comprise an analysis unit configured to analyse recorded psychophysical responses of the user measured in response to the provided stimuli.

The electrophysiologically based STM test unit may further comprise one or more electrodes for measuring electrophysiological responses of the user.

The electrophysiologically based STM test unit may further comprise an analysis unit configured to analyse the recorded electrophysiological responses of the user measured in response to the provided stimuli.

As also described in the 'detailed description of embodiments' and in the claims, the psychophysically and/or electrophysiologically based STM test unit may comprise at least one insert earphone. The insert earphone may comprise the output unit.

The psychophysically and/or electrophysiologically based STM test unit may be constituted by at least one insert earphone.

For example, the STM test unit may comprise two insert earphones.

Thereby, one ear at a time or both ears may be stimulated at the same time.

The psychophysically and/or electrophysiologically based STM test unit may comprise at least one hearing aid. The hearing aid may comprise the output unit.

The psychophysically and/or electrophysiologically based STM test unit may be constituted by at least one hearing aid.

For example, the STM test unit may comprise two hearing aids.

Thereby, one ear at a time or both ears may be stimulated at the same time.

The psychophysically and/or electrophysiologically based STM test unit may comprise a loudspeaker.

Further, a method of carrying out the PI-PB roll-over test by the psychophysically and/or electrophysiologically based STM test unit is provided.

The method may be for determining PI-PB roll-over of the user.

The method may be for distinguishing conductive from cochlear hearing loss.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A System:

In a further aspect, a system comprising an electrophysiologically based STM test unit as described above, in the 'detailed description of embodiments', and in the claims, AND an auxiliary device is moreover provided.

The system may be adapted to establish a communication link between the STM unit (e.g. between one or more of the units and/or hearing aid(s) and/or electrode(s) and/or insert earphones and/or loudspeaker) and the auxiliary device to provide that information (e.g. control and status signals, recorded responses, STM test stimuli, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the system.

An APP:

In a further aspect, a non-transitory application, termed an APP, is furthermore provided by the present disclosure. The APP comprises executable instructions configured to be executed on an auxiliary device to implement a user interface for the system described above in the 'detailed description of embodiments', and in the claims. The APP may be configured to run on cellular phone, e.g. a smartphone, or on another portable device allowing communication with said STM test unit and/or with one or more of the separate elements of the STM test unit.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
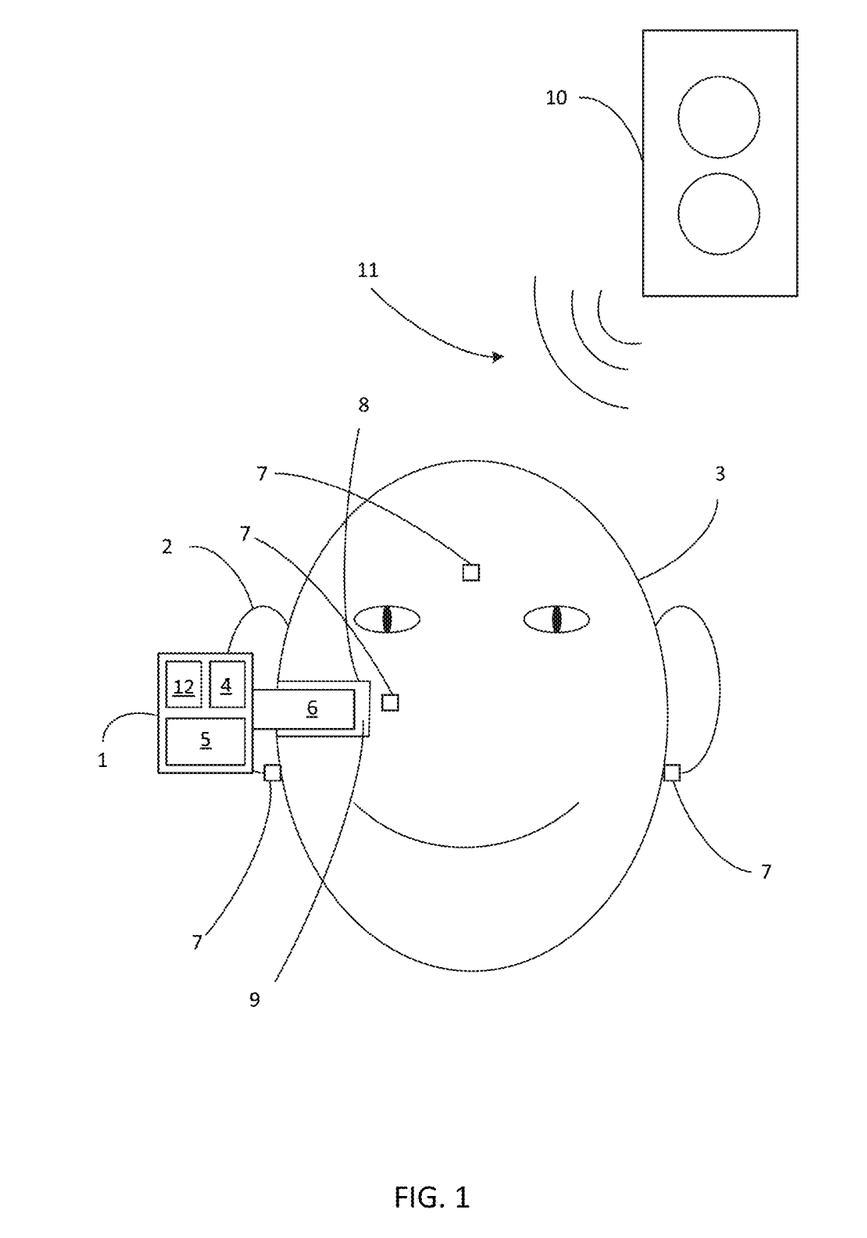
FIG. 1 shows an exemplary application scenario of an STM test unit according to the present disclosure.

FIG. 1 shows an exemplary application scenario of an STM test unit according to the present disclosure.

In FIG. 1, the STM test unit is illustrated as being an insert earphone 1.

As shown, the insert earphone 1 may contact the ear canal wall 8 of the user 3 to provide a space 9 between the output unit 6 of the STM test unit and the tympanic membrane.

The insert earphone 1 may be arranged in at least one of the ears 2 of a user 3. It is foreseen that the STM test unit may comprise two insert earphones 1 so that an insert earphone 1 may be arranged in each of the ears 2 of the user 3.

The STM test unit (the insert earphone 1) may comprise an STM stimulus generating unit 4, an analysis unit 5, and an output unit 6.

The STM stimulus generating unit 4 may be configured to provide STM test stimuli comprising at least one STM probe stimulus to a user 3 via the output unit 6 according to a predetermined STM test protocol. The STM test stimuli may further comprise at least one STM reference stimulus.

The STM test unit may comprise one or more electrodes for measuring electrophysiological responses of the user 3. In FIG. 1, it is illustrated that the STM test unit may comprise four electrodes 7 mounted on four locations on the head of the user 3 such as one on the forehead, one on the cheek, and one at each mastoid behind the ear. The electrodes 7 may be connected to the other parts of the STM test unit (e.g. the STM stimulus generating unit 4 and/or the analysis unit 5) by a wired or wireless connection. Alternative locations are however foreseen.

The analysis unit 5 may be configured to analyse the recorded electrophysiological responses of the user 3 measured in response to the provided stimuli.

In FIG. 1, it is illustrated that the STM test unit, instead of insert earphones, may comprise a loudspeaker 10 for providing stimuli 11 in the form of the STM test stimuli to the user 3. In such case, the loudspeaker may constitute the output unit 6 of the STM test unit.

The STM test unit may further comprise a memory 12. The memory 12 may store the STM test stimuli, and/or the predetermined STM test protocol, and/or one or more predetermined HTL values of the user 3, or one or more predetermined HTL values of two or more users (on which the STM test unit has been or will be used). The STM stimulus generating unit 4 may be configured to obtain/retrieve the stored STM test stimuli, and/or predetermined STM test protocol, and/or one or more predetermined HTL values of the user 3, or one or more predetermined HTL values of two or more users, from said memory 12.

Figure 2:
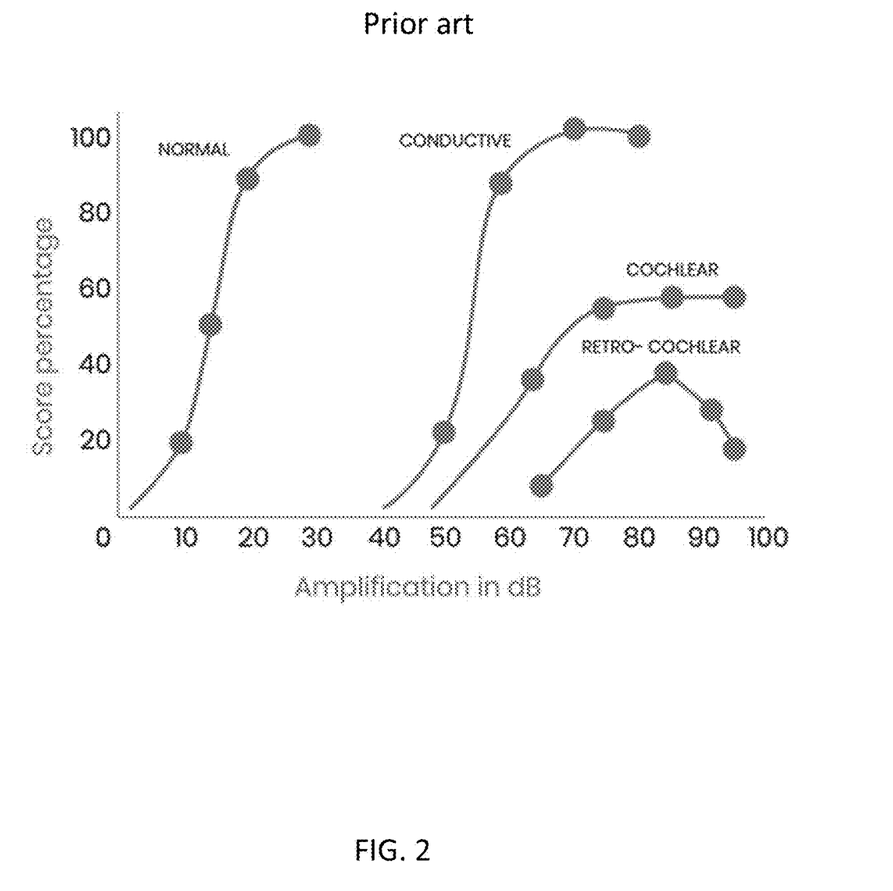
FIG. 2 shows an exemplary prior art speech audiogram.

FIG. 2 shows an exemplary prior art speech audiogram.

In the exemplary prior art [2] speech audiogram of FIG. 2, the score percentage (correct word score percentage) is shown as a function of amplification (in dB).

Four exemplary speech audiograms are shown, i.e. for a normal hearing person ('NORMAL'), a person with conductive hearing loss ('CONDUCTIVE'), a person with cochlear hearing loss ('COCHLEAR'), and a person with retro-cochlear hearing loss ('RETRO-COCHLEAR').

As seen in FIG. 2, for normally hearing people and for patients with hearing loss of conductive or cochlear origin, the typical pattern of results may be a monotonous increase in performance (correct word score percentage) with increasing level that flattens out at a certain level.

For the normally hearing person ('NORMAL'), the performance is shown to flatten out at approximately 30 dB amplification, while for persons with conductive ('CONDUCTIVE') or cochlear hearing loss ('COCHLEAR'), the performance flattens out at approximately 70 dB and 75 dB, respectively.

In addition, as indicated in FIG. 2, differences in performance at the ceiling (at the maximum of the score percentage) may be used to distinguish conductive from cochlear hearing loss. Diagnosing conductive hearing loss usually requires measurement of bone-conduction hearing thresholds, which are difficult to measure—particularly in remote-care scenarios.

For a person with retro-cochlear hearing loss ('RETRO-COCHLEAR'), a roll-over effect may be observed. The roll-over effect is characterised by the performance increases, peaks, and then reduces again as amplification increases. Such a roll-over is typically interpreted as an indication of hearing loss of retro-cochlear origin.

Accordingly, the STM-based 'Speech Audiogram' may be useful both to assess PI-PB roll-over as well as to distinguish conductive from cochlear hearing loss.

Figure 3:
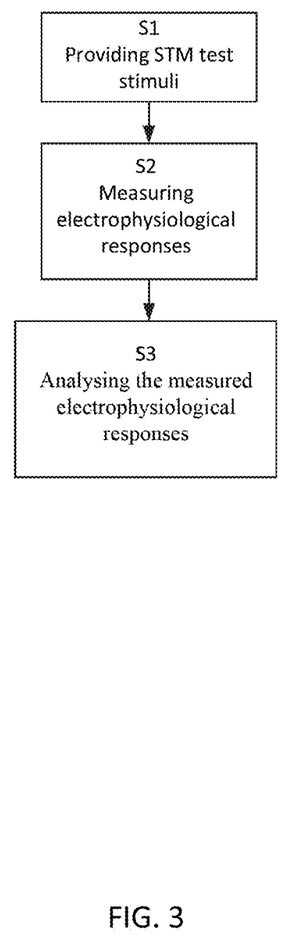
FIG. 3 shows an exemplary flow diagram of a method of electrophysiologically based STM testing of a user according to the present disclosure.

FIG. 3 shows an exemplary flow diagram of a method of electrophysiologically based STM testing of a user according to the present disclosure.

The method of electrophysiologically based STM testing of a user may comprise a step of providing (S1) STM test stimuli comprising at least one STM probe stimulus to at least one of the ears of the user by an STM stimulus generating unit, via an output unit, according to a predetermined STM test protocol.

The method of electrophysiologically based STM testing of a user may comprise a step of measuring (S2) electrophysiological responses of the user in response to the provided STM test stimuli.

The method of electrophysiologically based STM testing of a user may comprise a step of analyzing (S3) the measured electrophysiological responses of the user by an analysis unit.

The method of electrophysiologically based STM testing of a user may be carried out by the electrophysiologically based STM test unit of the present disclosure.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[1] Magits, S., Moncada-Torres, A., Van Deun, L., Wouters, J., van Wieringen, A., & Francart, T. (2019). The effect of presentation level on spectrotemporal modulation detection. Hearing Research, 371, 11-18.
[2] https://www.otohub.com/pure-tone-test-and-speech-test/.

The invention claimed is:

1. Electrophysiologically based Spectro-Temporal Modulation (STM) test unit, the STM test unit comprising:
an STM stimulus generating unit;
an output unit;
wherein the STM stimulus generating unit is configured to provide STM test stimuli comprising at least one STM probe stimulus to a user via the output unit according to a predetermined STM test protocol,
wherein the STM test unit further comprises:
one or more electrodes for measuring electrophysiological responses of the user; and
an analysis unit configured to analyse the recorded electrophysiological responses of the user measured in response to the provided STM probe stimuli,
wherein the predetermined STM test protocol comprises:
providing successive bursts of STM reference stimuli, providing modulated STM probe stimuli at random times, and
varying the degree of modulation of the STM probe stimuli according to a tracking procedure to obtain a threshold.

2. Electrophysiologically based STM test unit according to claim 1, wherein the STM stimulus generating unit is configured to shape a sound pressure level (SPL) of said STM probe stimulus as a function of frequency based on a predetermined hearing threshold level (HTL) of the user, where said predetermined HTL is stored in a memory of the electrophysiologically based STM test unit.

3. Electrophysiologically based STM test unit according to claim 1, wherein the electrophysiologically based STM test unit comprises a timing unit for determining an initiation of the predetermined STM test protocol, wherein the initiation of the predetermined STM test protocol comprises
the STM stimulus generating unit providing STM test stimuli comprising at least one STM probe stimulus to the user, and
the one or more electrodes measuring the corresponding electrophysiological responses.

4. Electrophysiologically based STM test unit according to claim 1, wherein the electrophysiologically based STM test unit comprises a memory, where the memory stores the STM test stimuli and/or the predetermined STM test protocol.

5. Electrophysiologically based STM test unit according to claim 1, wherein the electrophysiologically based STM test unit comprises or is constituted by at least one insert earphone.

6. Electrophysiologically based STM test unit according to claim 1, wherein the electrophysiologically based STM test unit comprises or is constituted by at least one hearing aid.

7. Electrophysiologically based STM test unit according to claim 6, wherein at least one insert earphone or at least one hearing aid comprises the one or more electrodes.

8. Electrophysiologically based STM test unit according to claim 1, wherein the electrophysiologically based STM test unit comprises a loudspeaker.

9. Electrophysiologically based STM test unit according to claim 1, wherein said one or more electrodes are EEG electrodes.

10. Electrophysiologically based STM test unit according to claim 1, wherein said STM test stimuli comprises temporal modulations around 4 Hz and spectral modulations around 2 cycles/octave.

11. Electrophysiologically based Spectro-Temporal Modulation (STM) test unit, the STM test unit comprising:
an STM stimulus generating unit;
an output unit;
wherein the STM stimulus generating unit is configured to provide STM test stimuli comprising at least one STM probe stimulus to a user via the output unit according to a predetermined STM test protocol,
wherein the STM test unit further comprises:
one or more electrodes for measuring electrophysiological responses of the user; and
an analysis unit configured to analyse the recorded electrophysiological responses of the user measured in response to the provided STM probe stimuli,
wherein the predetermined STM test protocol comprises:
providing a continuous on-going stimulus that alternates between STM reference stimulus intervals and STM probe stimulus intervals,
varying a degree of modulation in each of the modulated STM probe stimulus intervals, and varying the degree of modulation of the STM probe stimulus according to a tracking procedure to obtain a threshold.

12. Electrophysiologically based Spectro-Temporal Modulation (STM) testing method using an STM test unit that comprises:

an STM stimulus generating unit;

an output unit;

wherein the STM stimulus generating unit is configured to provide STM test stimuli comprising at least one STM probe stimulus to a user via the output unit according to a predetermined STM test protocol, wherein the STM test unit further comprises:

one or more electrodes for measuring electrophysiological responses of the user; and an analysis unit configured to analyse the recorded electrophysiological responses of the user measured in response to the provided STM probe stimuli, wherein the method comprises:

providing successive bursts of STM reference stimuli, providing modulated STM probe stimuli at random times, analysing the recorded electrophysiological responses to determine responses to the provided STM probe stimuli, and varying the degree of modulation of the STM probe stimuli according to a tracking procedure to obtain a threshold.

13. The method according to claim 12, wherein the method further comprises shaping a sound pressure level (SPL) of said STM probe stimulus as a function of frequency based on a predetermined hearing threshold level (HTL) of the user.

14. The method according to claim 12 further includes assessing Performance Intensity, Phonetically Balanced (PI-PB) roll-over based on recorded STM probe stimuli and STM reference stimuli.

15. The method according to claim 12, wherein the analysis performed by the analysis unit distinguishes conductive from cochlear hearing loss.

16. Electrophysiologically based Spectro-Temporal Modulation (STM) testing method using an STM test unit comprising:

an STM stimulus generating unit;

an output unit;

wherein the STM stimulus generating unit is configured to provide STM test stimuli comprising at least one STM probe stimulus to a user via the output unit according to a predetermined STM test protocol, wherein the STM test unit further comprises:

one or more electrodes for measuring electrophysiological responses of the user; and an analysis unit configured to analyse the recorded electrophysiological responses of the user measured in response to the provided STM probe stimuli, wherein the method comprises:

providing a continuous on-going stimulus that alternates between STM reference stimulus intervals and STM probe stimulus intervals, varying a degree of modulation in each of the modulated STM probe stimulus intervals, analysing the recorded electrophysiological responses to determine responses to stimulus alternations, by averaging in the time domain predefined sections of the recorded electrophysiological responses time-locked to stimulus alternations, and varying the degree of modulation of the STM probe stimulus according to a tracking procedure to obtain a threshold.

* * * * *